United States Patent [19]

Jones

[11] 4,164,396

[45] Aug. 14, 1979

[54] PRODUCTION OF COMBUSTIBLE PRODUCTS FROM WASTE MATERIALS

[75] Inventor: Brian Jones, Over Hulton near Bolton, England

[73] Assignee: The General Engineering Company (Radcliffe) Limited, Manchester, United Kingdom

[21] Appl. No.: 888,556

[22] Filed: Mar. 20, 1978

Related U.S. Application Data

[63] Continuation-in-part of Ser. No. 711,548, Aug. 4, 1976, abandoned.

[30] Foreign Application Priority Data

Apr. 28, 1976 [GB] United Kingdom ............... 17169/76

[51] Int. Cl.$^2$ ........................... C10L 5/46; C10L 5/22
[52] U.S. Cl. ............................................. 44/1 D; 44/2

[58] Field of Search ............. 44/1 R, 1 D, 2, 6, 11–13

[56] References Cited

U.S. PATENT DOCUMENTS

| | | | |
|---|---|---|---|
| 1,486,488 | 3/1924 | Hinman | 44/6 |
| 3,304,991 | 2/1967 | Greenfield | 44/1 R |
| 3,506,414 | 4/1970 | Skendrovic | 44/1 R |
| 4,063,906 | 12/1977 | Beningson et al. | 44/2 |

*Primary Examiner*—Carl Dees
*Attorney, Agent, or Firm*—James E. Nilles

[57] ABSTRACT

In accordance with this invention there is provided a method of and apparatus for producing a combustible product from waste materials of which part of the fuel consists of pulverized combustible solid waste material, this part of the fuel being at least coated with combustible liquid waste.

7 Claims, 1 Drawing Figure

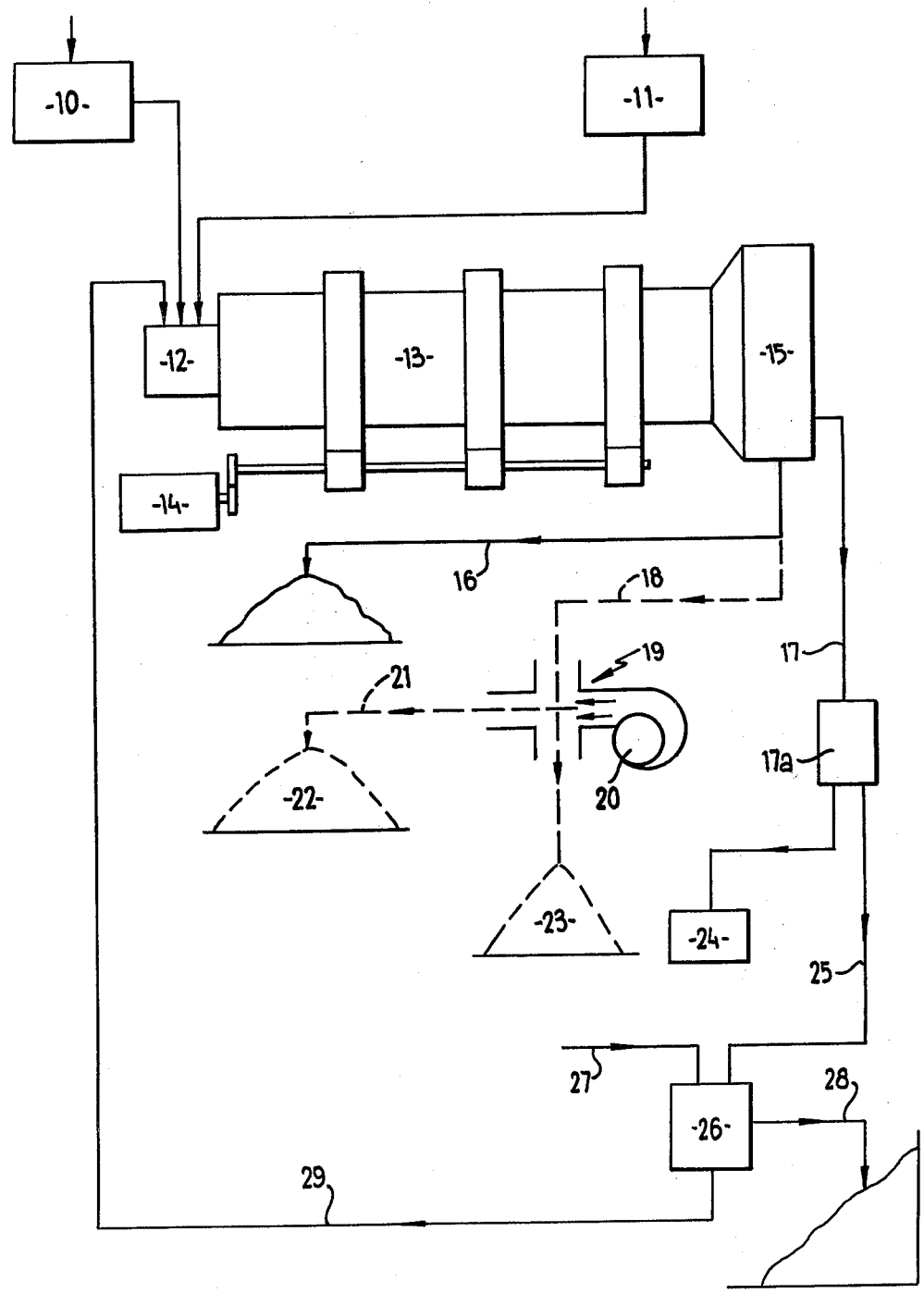

PRODUCTION OF COMBUSTIBLE PRODUCTS FROM WASTE MATERIALS

REFERENCE TO RELATED CO-PENDING APPLICATION

This application is a Continuation-in-part of application Ser. No. 711,548, filed Aug. 4, 1976 and now abandoned, which application claims priority from British Application Ser. No. 17196/76, filed Apr. 28, 1976.

BACKGROUND OF THE INVENTION

1. Field of Use

The invention concerns method and apparatus for the production of a combustible product derived from waste material.

2. Description of the Prior Art

Waste products, and in particular solid domestic and trade refuse has for many years been disposed of by one or other of several methods namely by tipping, burning or, more recently, composting. All of these disposal methods have inherent disadvantages.

For example, if waste is to be tipped it is first necessary to locate an area which can be used and in most instances such an area is removed from the source of the waste by a considerable distance and thus transportation costs are high. Furthermore the area used for tipping is unsightly and may, unless precautions are taken, become a breeding ground for example, for rodents. Eventually a tip becomes full and a new site must be located, but before the area used as a tip becomes re-usable for some other purpose a considerable period of time must elapse. In some cases the period will extend to several years.

Waste disposal by burning requires initial capital expenditure in the construction of incinerators and the burning of waste in many instances requires the use of supplementary fuel. The heat produced is usually completely wasted since no means of efficiently using it is available and in any event the burning of waste in incinerators is a low efficiency method of producing heat which requires specially designed and thus expensive equipment. Incineration produces a large amount of ash which must subsequently be disposed of and this in itself increases the cost of waste disposal by incineration.

The method of waste disposal by composting can be used for the disposal of solids and non-toxic liquids and the compost when produced must still be tipped or stored prior to disposal for agricultural purposes. Clearly the compost produced cannot be used as a humus on grazing land without careful screening (requiring additional plant) since it will contain materials such as broken glass and solid materials which are harmful to livestock.

The need exists therefore to provide a waste disposal means which is ecologically acceptable. Taking all of the abovementioned factors into account and also bearing in mind the fact that the world demand for fuel is increasing while the supply of fuel is decreasing it is clearly desirable to utilize all available sources of fuel in order to effect a reduction in the demand for conventional fuels such as coal, oil and gas and the applicant has appreciated the feasibility of producing a commercially acceptable fuel derived from waste materials.

It is known to the applicant that proposals have been made in the past for the production of a fuel derived from waste material and that attempts have been made to put such proposals into effect.

For example, it has been proposed to treat refuse by a process such as ball or hammer milling to break down solid waste into a condition such that, by the addition of binders, the broken down waste can be pelletised or briquetted. Such processes, which clearly require the carrying out of a multiplicity of process steps, are expensive and in many cases the end product is not capable of being burnt efficiently. For example, it is known to use non-combustible materials as binders for the broken down waste when pelletising or briquetting but such binders have the disadvantage that they reduce the calorific value of the end product and create relatively large amounts of ash which must then be disposed of. In addition of course to the steps of breaking down the waste and adding binders, it is essential to provide apparatus to compress the material to produce pellets or briquettes and, in some cases to remove excess liquids.

It is also found that the storage of briquetted or pelletised waste derived fuels may present problems since if these fuels are externally stored the affect of rain, frost, snow or simply lengthy periods of storage will result in deterioration of the fuel thus it may be found necessary to provide under cover storage facilities, again adding cost to the fuel.

One proposal for the production of a waste material derived fuel is disclosed in U.S. Pat. No. 1,486,488 in which it is proposed to mix together garbage, sawdust, rubbish, weeds and other similar material of a fibrous or cellular combustible nature and to mix these materials in ground-up condition with for example swamp clay or peat-muck. To this mass it is said to be preferable to add a quantity of oil, the proportion of the latter being determined to some extent of the quantity of garbage in the ground-up mixture. The mass produced is then compressed to produce a mass from which the major proportion of the moisture has been expelled and the mass is then encased in, for example, paper tubes. This method of producing fuel requires a multiplicity of process steps all of which must be taken into account when calculating production costs.

It is known that many solid fuel furnaces, such as travelling grate furnaces will only burn carefully graded fuel efficiently and consequently the equipment provided for handling the fuel and feeding it to the furnace is designed specifically to handle the graded fuel. If it is desired to use briquetted waste derived fuel the latter must be produced in such sizes as to meet the fuel size requirement of the type of furnace in which it is to be burnt and thus specially designed briquetting equipment is necessary and costly. It should be borne in mind in this context that simply to desintegrate refuse with a view to feeding it to furnaces of the kind under discussion will not obviate the problem outlined above for the reason that even if desintegrated waste could be fed to the furnace the size variation of the material, together with density variations between batches of material and differences in calorific value would result in uneven combustion. In addition, light weight materials, such as pieces of paper, would blow off the furnace bed and burn above it. Similar problems would exist in fluidised bed furnaces.

Briefly stated therefore the amount of waste derived fuel that is now produced is very small in relation to total fuel demands due to the following factors:

(a) The high cost of conversion of waste (b) The high cost of handling and storage (c) The inefficient combustion

SUMMARY OF THE INVENTION

A primary object of the present invention is to provide a waste material derived fuel which can be produced with minimal processing and which will have a high calorific value in relation to the calorific value of the solid content of the waste.

In addition it is a further object of the invention to produce a fuel that is of substantially constant density which can be stored externally without significant deterioration and can be handled by existing conventional solid fuel handling equipment.

A further object is to provide a fuel that can be burnt in conventional furnaces such as chain grate or fluidised bed furnaces, incinerators, cement kilns or the like as an additive to, or replacement for, the conventional fuels currently used therein.

Thus according to one aspect of the present invention there is provided a method of producing a fuel derived from waste material including the step of combining refuse containing fibrous material of low wet strength and of a primarily combustible nature with liquid combustible material to enhance the calorific value of the refuse including feeding the refuse and the combustible liquid into a rotary drum in which the materials are tumbled gradually to reduce the refuse to particulate form and in which the resistance to breakdown of at least the fibrous material is aided by the dispersal thereover of the combustible liquid, the quantity of the refuse fed to the drum being regulated such that free space exists in the drum to ensure that the refuse can tumble freely therein as the drum is rotated, whereby the reduction to particulate form of the low wet strength content of the refuse is assisted by collision and intermingling thereof with materials of greater strength and density thereby to produce a homogenised, discrete particulate mass, removing the mass from the drum and removing from the mass at least large pieces of non-combustible material which are contained in the originally supplied refuse thereby to produce an air permeable, particulate fuel of substantially constant density, particle size and calorific value.

The invention also comprises the method of producing a composite fuel within a combustion chamber comprising the steps of simultaneously feeding into the said combustion chamber, in predetermined ratio, a quantity of fuel of the kind produced by the method hereinabove defined and a conventional fuel.

According to another aspect of the present invention there is provided apparatus for producing fuel of the aforesaid character. Apparatus for producing a fuel derived from waste material includes a first supply means for solid waste material, a second supply means for liquid combustible material, a rotary drum for receiving materials from the first and said second supply means, and a separator at the outlet end of the rotary drum. The apparatus further includes a magnetic separator beyond the separator at the outlet of the rotary drum and a granulator downstream of the magnetic separator, means for conveying material from the separator at the outlet end of the rotary drum to the magnetic separator and to the granulator and means for conveying granulated material from the granulator to the rotary drum for re-cycling therethrough. The apparatus also includes a classifier downstream of the separator at the outlet of the rotary drum, means for conveying granulated material from the separator at the outlet of the rotary drum to the classifier and gaseous fluid supply means associated with the classifier for separating light granulated materials from heavier granulated materials passing through the classifier.

BRIEF DESCRIPTION OF THE DRAWING

The invention will now be described further, by way of example only, with reference to several practical forms thereof and the accompanying flow diagram shown in the single FIGURE in the drawing which illustrates schematically a preferred form of apparatus and method for producing fuel derived from waste material.

DESCRIPTION OF THE PREFERRED EMBODIMENT

Thus an apparatus for producing fuel derived from waste material comprises a container 10 for combustible liquid and a container 11 for refuse. The material tipped into container 11 may comprise both domestic and industrial solid refuse. Feed means are provided for transferring materials from containers 10 and 11 to the inlet 12 of a rotary drum 13 which latter is, in practice, mounted with its longitudinal axis horizontal. The drum is provided with drive means 14 adapted to rotate it relatively slowly and continuously for the purpose of tumbling the materials contained therein and thus causing breakdown of the low strength solid materials into particulate form.

At the outlet end of the drum 13 (which may be of the order of twelve feet in diameter and seventy feet in length) is provided a separator 15 from which issue two streams of material, namely a granulated fraction 16 and a non-granulated fraction 17. The granulated fraction conveniently consists of granules which will pass a 38 mm mesh while the non-granulated fraction will not pass such a mesh. The fraction 16 will consist of material which is at least coated with the combustible liquid and the particles will comprise broken down low wet strength fibrous material such as paper, rags and the like, together with any other solid materials of relatively low strength which have been reduced to particulate form and liquid coated by reason of being subjected to tumbling action and collision with higher strength materials which constitute the fraction 17 and include materials such as tin cans, large pieces of metal, and the like. The fraction 16 is now capable, without further treatment, of being used as a fuel but it will consist of particles of various density. If it is desired to further grade the fraction 16 it may be passed (as indicated by the broken line 18) to a classifier 19 which includes an air blower 20 arranged to blow a stream of air through the falling mass of particles to separate those of a low density from those of a higher density. Thus two streams of particles exist from the classifier, namely a stream of particles carried in the air stream 21 and a stream of higher density particles which fall through the air stream. Thus two grades of fuel can be collected from the classifier 19, namely a low density grade 22 and a higher density grade 23. The density of the particles removed by the air stream 21 will depend upon the velocity thereof and thus grading in a predetermined manner can be achieved. Both grades of particles can be used as fuel without further treatment and thus fuels of predetermined size and density can be produced to meet the specific requirements of an end user. It is possible to so arrange the air velocity that only the relatively light combustible material is carried on the air stream thus making it possible to ensure that the material falling through the classifier is almost wholly non-combustible, thus the fraction which forms the mound 23 will consist of waste material and at the same time the mound 22 will consist of high calorific value fuel only.

The fraction 17 of material pouring from the separator 15 will, as stated above, contain non-combustibles such as tin cans and combustibles such as large pieces of wood and thus to maximise fuel production this fraction is fed through a magnetic separator 17a which will remove ferrous non-combustibles for baling in a baler 24 and will pass non-ferrous materials in a separate stream 25 to a granulator 26 wherein the size of the pieces of material can be reduced. The granulator can also be directly fed with solid industrial waste 27 to produce a relatively large size mass containing combustibles in granular form and also non-granular materials such as paper and rags which will not easily break down in the granulator. The highest density material which forms stream 28 will contain substances that have not been completely granulated and will contain some combustibles and some non-combustible material. This material is separated from the stream 29 of lower density granulated and non-granulated material (which will also contain combustible and non-combustible materials). The highest density material 28 is collected for disposal. The stream 29 of granulated material is preferably fed to the inlet 12 of the drum 13 to be mixed with non-treated refuse from container 11 and the liquid combustible material from container 10 for processing to produce fuel which can be used without further treatment or which can be subjected to density classification as described above.

The presence of materials such as large pieces of metallic waste in the drum 13 assists in the breakdown of the other solid waste.

Thus the process of producing fuel from waste comprises the mixing together of liquid waste and solid waste (some of which may have been pre-processed as described above) to ensure that the solid content of the mixture is broken down into particulate form as a result of wetting it out with a liquid combustible material combined with mechanically working it in a rotary drum. During the process steps must be taken to ensure that there is free space within the rotary drum to enable the tumbling action to take place to achieve optimum breakdown of the solid materials, thus overfilling the drum will result in inefficient breakdown of solid materials and should be avoided.

The tumbling action within the drum causes the material to be gradually broken down and thus the residence time of material in the drum may be relatively lengthy.

To produce the fuel the process essentially requires the addition of liquid combustible material such as waste oil sludge and the invention is based upon the appreciation that by addition of such a combustible liquid material to the rotary drum apparatus referred to above it is possible to feed waste material consisting of domestic waste and trade waste. As the drum is rotated and the solid content of the material contained therein becomes wetted-out by the liquid combustible material, breakdown of some of the solid materials, particularly those with a low wet strength, being assisted by the presence of the liquid in the drum.

Tests have shown that it is possible to produce a combustible material having a calorific value of the order of 20,500 KJ/kgm. on a dry, ash free basis, and it is found that this calorific value could be increased as necessary.

The particle size of the material produced is found to be satisfactory for burning in combination with conventional fuels in furnaces of the kind having a moving grate or in fluidised bed, oil or gas fired furnaces. Small pieces of non-combustible materials contained within the fuel, such as broken glass, do not give rise to fusing problems and in the case of travelling grate furnaces the fuel is found to assist the combustion of low grade coal, since due to the dispersal of the fuel throughout the bed of coal and the tendency of the fuel to burn more quickly than the coal, air passages are created through the coal. Additionally the dispersion of the fuel throughout the coal prevents agglomeration of pieces of partially burnt coal and thus the formation of large clinker. A further advantage of mixing refuse derived fuel with coal lies in the fact that higher sulphur content coal can be used without necessarily first de-sulphurising the coal thus savings can be made in the cost of running the furnace since the cost of de-sulphurising is reduced and thus the problem of disposing of the acidic slurry created by de-sulphurising is reduced. External storage of the fuel is found to be possible because the surface layer of the fuel tends to form a crust and thus prevents the saturation of the stockpile with water. The result of this encrustation is to maintain the calorific value of the fuel.

With a 40%–60% mixture of refuse derived fuel to coal it has been found that boiler efficiency of the order of 80% can be achieved and at the same time the carbon content of the ash is substantially reduced when compared with the carbon content of ash produced by burning coal alone.

I claim:

1. A method of producing a fuel derived from waste material including the steps of: combining refuse containing fibrous material of low wet strength and of a primarily combustible nature and also containing material of greater strength and density, including non-combustible material, with liquid combustible material to enhance the calorific value of the refuse, feeding the refuse and the liquid combustible material into a rotary drum in which the refuse is tumbled gradually to reduce the refuse to particulate form and in which the resistance to breakdown of at least the fibrous material is reduced by the dispersal thereover of the liquid combustible material; regulating the quantity of the refuse fed to the drum so that free space exists in the drum to ensure that the refuse can tumble freely therein as the drum is rotated, rotating the drum so that reduction to particulate form of the fibrous material of low wet strength of the refuse is assisted by collision and intermingling thereof with said pieces of non-combustible materials of greater strength and density thereby to produce a homogenised, discrete particulate mass, removing the mass from the drum, and removing from the mass at least large pieces of non-combustible material which are contained in the originally supplied refuse thereby to produce an air permeable, particulate fuel of substantially constant density, particle size and calorific value.

2. A method as set forth in claim 1 including the step of passing said mass removed from said drum through a separator.

3. A method as set forth in claim 1 wherein said refuse contains ferrous material and including the steps pf passing said mass removed from said drum through a separator, separating a granulated fraction from a non-granulated fraction, passing said non-granulated fraction to a magnetic separator and removing the ferrous material therefrom, passing the non-granulated fraction when said ferrous material has been removed therefrom to a granulator and granulating same for recycling through said drum and addition to the previously formed and separated granulated fraction.

4. A method as set forth in claim 3 including the steps of adding said granulated material from which said ferrous material has been removed to said granulated fraction produced by said drum.

5. A method as set forth in claim 1 wherein said refuse contains ferrous material and including the steps of passing said mass removed from said drum through a separator, separating a granulated fraction from a non-granulated fraction, passing said non-granulated fraction to a magnetic separator and removing the ferrous material therefrom, passing the non-granulated fraction when said ferrous material has been removed therefrom to a granulator, feeding solid industrial waste to said granulator and granulating the mixed materials in said granulator, feeding the granulated material from said granulator to said drum for admixture with the refuse and combustible liquid material in said drum, removing the homogenised, discrete particulate mass from the drum and removing from the mass at least the large pieces of non-combustible material which are contained in the refuse supplied to the drum thereby to produce an air permeable particulate fuel of substantially constant density, particle size and calorific value.

6. A method as set forth in claim 1 including the step of passing said mass removed from said drum through a separator, separating a granulated fraction from a non-granulated fraction, passing said granulated fraction to a classifier, blowing air through said classifier and separating low density particles from higher density particles thereby to produce two grades of fuel.

7. A method as set forth in claim 1 including the step of passing said mass removed from the drum through a separator, separating a granulated fraction from a non-granulated fraction, passing said granulated fraction to a classifier, blowing air through said classifier at low velocity thus to separate light combustible material from heavier material containing non-combustible granules; and collecting the light combustible material to provide an air permeable particulate fuel of substantially constant density, particle size and calorific value.

* * * * *